United States Patent [19]

Smeltzer et al.

[11] Patent Number: 5,530,872

[45] Date of Patent: Jun. 25, 1996

[54] METHOD AND SYSTEM FOR DIRECTING DEVICE DRIVER TO SERVICE MULTIPLE SEQUENTIAL INTERRUPT REQUESTS GENERATED BY I/O DEVICE CONNECTED THERETO

[75] Inventors: Kenneth D. Smeltzer, Delray Beach; Alan F. Neel, II, Boca Raton; Timothy J.-M. Louie, Boca Raton; Frank J. Schroeder, Boca Raton; James P. Ward, Boca Raton; Robert H.-C. Lin, Boca Raton; Robert G. Hillis, Boca Raton, all of Fla.

[73] Assignee: International Business Machines Corporation, Armonk, N.Y.

[21] Appl. No.: 995,685

[22] Filed: Dec. 23, 1992

[51] Int. Cl.$^6$ .................................................. G06F 13/24
[52] U.S. Cl. ................ 395/733; 364/270.5; 364/270.6
[58] Field of Search ............................... 371/62; 395/725, 395/733

[56] References Cited

U.S. PATENT DOCUMENTS

| 4,099,255 | 7/1978 | Stanley et al. | 395/725 |
|---|---|---|---|
| 4,956,842 | 9/1990 | Said | 371/62 |
| 4,982,404 | 1/1991 | Hartman | 371/62 |
| 5,398,332 | 3/1995 | Komoda et al. | 395/575 |
| 5,408,643 | 4/1995 | Katayose | 395/575 |

*Primary Examiner*—Krisna Lim
*Attorney, Agent, or Firm*—Robert S. Babayi; Calfee, Halter & Griswold

[57] ABSTRACT

A system and method is provided for detecting and correcting a lost hardware interrupt generated by an input/output device in a multiple I/O port computer environment. The lost interrupt condition is caused by the simultaneous occurrence of (i) the reading and subsequent resetting of a interrupt request status bit in an I/O port by a device driver and (ii) the setting of the interrupt request status bit by an I/O device attached to the port. Because the interrupt request status bit is reset before it can be read, the device driver fails to see an acknowledgement of the previous data transmission to the I/O device, and the system encounters a deadlock condition. After a normal timeout timer expires the device driver terminates transmission of data and returns a "cancel or retry" message to the request originator. The present invention prevents a deadlock condition in this situation by providing a second timer in addition to and of significantly less duration than the normal timeout timer. Upon expiration of this additional timer, the device driver, upon satisfying a number of conditions, presumes that an interrupt has been lost, and proceeds to send the next byte of data to the I/O device, thereby preventing a deadlock condition.

21 Claims, 4 Drawing Sheets

METHOD AND SYSTEM FOR DIRECTING DEVICE DRIVER TO SERVICE MULTIPLE SEQUENTIAL INTERRUPT REQUESTS GENERATED BY I/O DEVICE CONNECTED THERETO

FIELD OF THE INVENTION

The present invention relates generally to mechanisms for communicating between components in a computer system, and more particularly to a system and method for insuring detection of a hardware interrupt signal generated by an input/output device in a computer system.

BACKGROUND OF THE INVENTION

In computer systems having a processor and more than one attached input/output (I/O) device, I/O ports are often used as the interface between the processor and the attached I/O devices. The I/O devices are controlled by a device driver which is implemented in software as a set of subroutines in the processor. In such systems, a mechanism must be provided to coordinate communications through the I/O port between the device driver and the I/O device. Generally, two such coordination methods are known: the polled transmission method and the hardware interrupt method.

In the polled transmission method the processor runs detection cycles to sequentially poll or interrogate the I/O devices through the I/O ports to determine the operational status of the I/O devices. By means of this polling transmission method, the device driver is notified of the readiness of a particular device to send or receive data. The polled transmission method, however, requires the processor to run detection cycles continuously, regardless of the relative activity or inactivity of the attached I/O devices. The Disk Operating System (DOS) currently utilizes the polled transmission method, although it could be written to utilize the hardware interrupt method.

The hardware interrupt method is the mechanism used to coordinate communications between the device driver and attached I/O devices in the IBM® OS/2® operating system. In the hardware interrupt method, the processor does not run special processor detection cycles to sequentially poll the I/O devices to determine their operational status. Instead, the I/O devices directly provide programmable interrupt controller hardware with an indication of their operational status, thereby permitting better utilization of the processor to schedule other tasks to run. By means of an interrupt signal, the individual I/O devices notify the programmable interrupt controller that they are ready to send or receive data. The programmable interrupt controller in turn notifies the processor of the interrupt status of an I/O device, and the processor invokes the device driver to service the interrupt request.

The hardware interrupt method, however, is susceptible to potential communications difficulties between the device driver and the attached I/O devices in some computer systems. In particular, a lost hardware interrupt condition between the device driver and an attached I/O device may occur if more than one parallel I/O port adapter shares the same interrupt level. This situation may occur, for example, when multiple parallel ports are implemented on the IBM® PS/2® Micro Channel®.

Specifically, each of the I/O ports in these systems includes a read-only device status register for its corresponding attached I/O device which provides an indication of the operational status of the I/O device by containing the status of its hardware interrupts. The register includes an acknowledge bit which is pulsed active by an I/O device when it needs servicing by the device driver, and an interrupt request status bit which is latched active by the acknowledge pulse to indicate to the device driver that an interrupt is pending for that I/O device. A pulsed signal is one which is set active for a period of time and then set inactive. The acknowledge bit is pulsed active, for example, when an I/O device needs to acknowledge accurate transmission of a byte of data sent by the device driver. The device driver typically reads and subsequently clears the interrupt request status bit in the device status register which has been set by the acknowledge pulse and proceeds to send the next byte of data to the I/O device.

Due to the design of the parallel I/O port adapters described above, however, it is possible for the device driver to read and subsequently clear the interrupt request status bit in the device status register for a particular I/O device at the same time as the acknowledge pulse arrives to set the interrupt request status bit for that I/O device. As a result of these coinciding events, the device driver continues to wait for an active interrupt request status bit acknowledging receipt of the previous byte of data from the I/O device, while the I/O device waits for the next byte of data to be sent by the device driver. The problem is exacerbated in a multiple I/O device environment because each I/O port is sequentially polled by an interrupt service routine to monitor the interrupt request status bits for the I/O devices. Thus, the possibility of a device driver reading and subsequently clearing an interrupt request status bit simultaneously with the arrival of a corresponding acknowledge pulse increases with the number of I/O ports in the system.

Device drivers generally are provided with a timeout mechanism incorporated into their logic to terminate transmission of data to an I/O device after waiting a predetermined amount of time without receiving acknowledgement of successful transmission by the I/O device. From a user standpoint, the data transmission request is terminated for no apparent reason, and must be either retried or canceled. It is an object of the present invention, then, to provide a solution to the problem of the lost hardware interrupt occurring between a device driver and an attached I/O device, by improving the means by which hardware interrupts are detected by a device driver.

SUMMARY OF THE INVENTION

A method and system for detecting hardware interrupts is provided for a computer system comprising a processor, a plurality of input/output (I/O) ports and at least one I/O device connected to the processor by a corresponding I/O port. The processor interacts with a device driver and a programmable interrupt controller to coordinate data transfer to the attached I/O devices through the I/O ports. The device driver is a collection of subroutines which include the logic provided by the present invention. The programmable interrupt controller monitors the I/O devices attached to the I/O ports and notifies the processor if an I/O device has requested servicing by the device driver by activation of an interrupt signal, for example, to indicate that an I/O device has acknowledged accurate transmission of a byte of data sent to it by the device driver. The interrupt signal latches an interrupt request status bit in the I/O port to indicate that the I/O device has an interrupt request pending.

Once the programmable interrupt controller has identified an I/O device which requires service, the device driver executes read cycles to determine the state of the interrupt request status bit. The device driver reads the interrupt request status bit to determine the interrupt pending status, and the interrupt request status bit for that I/O device is subsequently cleared (interrupt no longer pending). The device driver proceeds to send the next byte of data to the I/O device. Accordingly, upon the next occurrence of an acknowledge signal by the I/O device to again latch the interrupt request status bit (interrupt pending) to acknowledge receipt of the last byte of data, the device driver subsequently reads and resets the interrupt request status bit.

The present invention as implemented in the device driver accommodates the lost interrupt situation which occurs upon the simultaneous occurrence of (i) the arrival of an acknowledge signal by an I/O device, which should set the interrupt request status bit for that device, and (ii) the reading and subsequent resetting of the interrupt request status bit by the device driver. In this situation, the interrupt status bit is never latched active to indicate an interrupt pending, because the reading of the device status register subsequently resets the interrupt request status bit inactive, thereby indicating to the device driver that no interrupt is pending for that device. Because the interrupt request status bit is reset before it can be read, the device driver fails to see an acknowledgement of the previous data transmission to the I/O device, and the system encounters a deadlock condition. After a normal timeout timer expires (typically on the order of 45 seconds) the device driver terminates transmission of data and returns a "cancel or retry" message to the request originator.

The present invention prevents a deadlock condition in this situation by providing a second timer in addition to and of significantly less duration than the normal timeout timer. Upon expiration of this additional timer, the device driver, upon satisfying a number of conditions, presumes that an interrupt has been lost, and proceeds to send the next byte of data to the I/O device, thereby preventing a deadlock condition.

DETAILED DESCRIPTION OF THE PREFERRED EMBODIMENT

Figure 1:
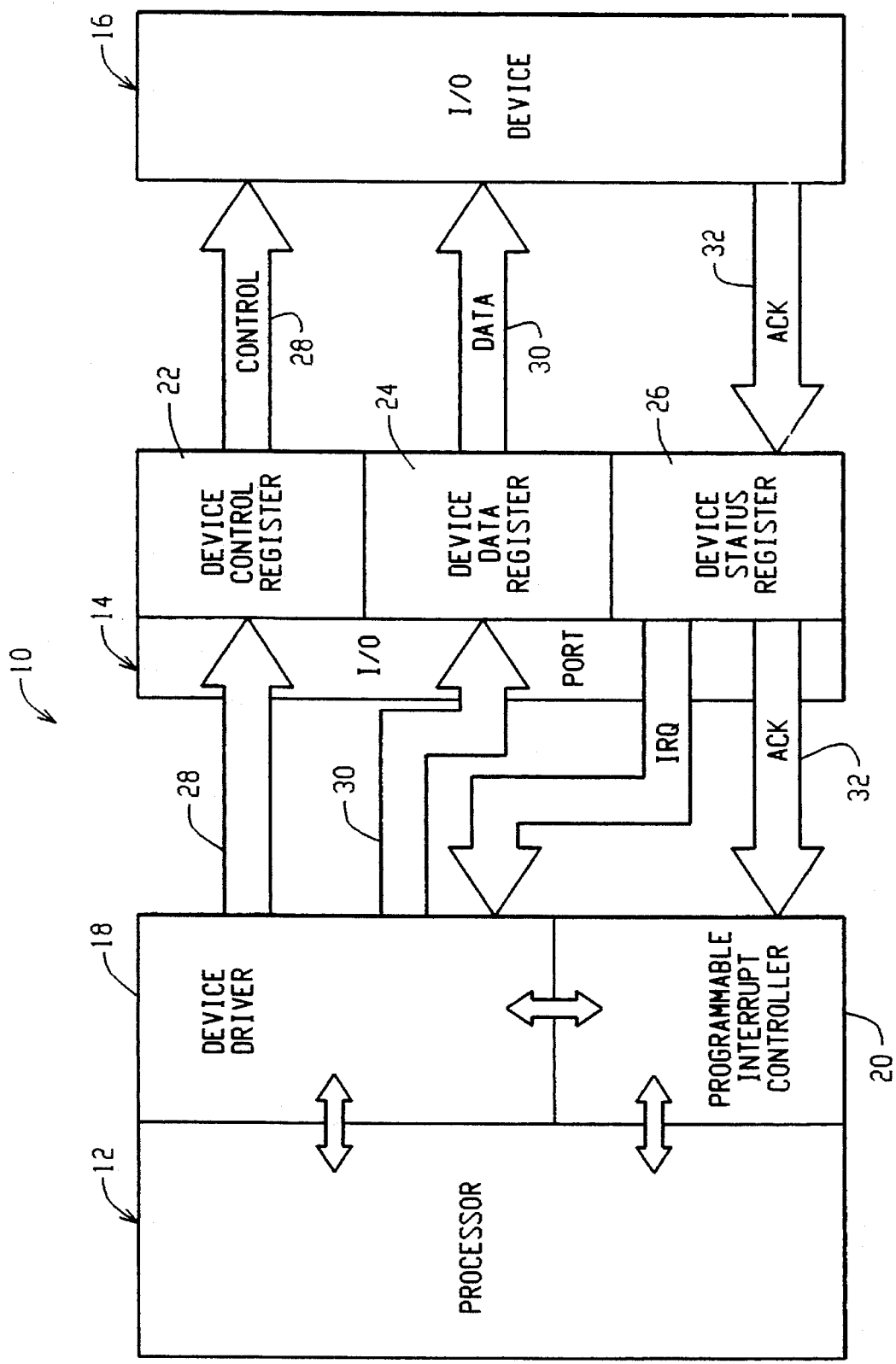
FIG. 1 is a block diagram of a computer system incorporating the method and system for detecting hardware interrupts of the present invention.

FIG. 1 is a block diagram of a computer system 10 in which is implemented the present inventive method and system for detecting hardware interrupts. The system 10 comprises a processor 12, a plurality of input/output (I/O) ports 14, and at least one I/O device 16 attached to a corresponding I/O port. Each I/O port is capable of supporting one I/O device. The I/O devices 16 may include printers or other auxiliary devices. In the preferred embodiment, the I/O port design is one which can be supported by the IBM® Micro Channel® architecture. The I/O port 14 shown in FIG. 1 is a parallel port which is IBM® Micro Channel® compatible, but it is contemplated that the present invention may be implemented in a system wherein I/O devices are serviced via serial or auxiliary ports.

The processor 12 communicates with each I/O device 16 through a separate I/O port 14, which serves as an operational interface between the processor and the I/O device. The processor 12 interacts with a device driver 18 and a programmable interrupt controller (PIC) 20. Data, control and status information is passed between the I/O devices and the device driver and programmable interrupt controller over the I/O ports. The processor 12 and the programmable interrupt controller are hardware devices. The device driver 18 is implemented in software as a collection of subroutines to be run by the processor 12 and which control message and data flow over the I/O port interfaces between the processor and the I/O devices. The programmable interrupt controller 20 monitors the I/O devices 16 attached to the I/O ports 14 and notifies the processor if an I/O device has requested servicing by the device driver by activation of an interrupt signal. The processor 12 schedules the device driver 18 to service I/O devices which have requested such service. Although only one I/O port 14 is shown in FIG. 2, additional I/O ports may be supported by the device driver 18 and the programmable interrupt controller in a similar configuration.

Each of the plurality of I/O ports 14 includes three registers which facilitate communications between an I/O device 16 and the programmable interrupt controller 20 and the device driver 18. These registers are a read-write device control register (DCR) 22, a read-write device data register (DDR) 24, and a read-only device status register (DSR) 26. The device control register 22 contains control messages which are sent by the device driver to the I/O port 14 and to an I/O device 16 over control lines 28. The device data register 24 is of sufficient length to hold a single byte of data which is to be sent by the device driver to the I/O port and to a destination I/O device over data lines 30. Although the flow of control messages and data may be bidirectional between the device driver 18 and an I/O device 16, for simplification purposes the data and control message flow is shown in FIG. 1 as being unidirectional, as would be the case if the attached I/O devices were of the type capable only of receiving information, such as attached printers.

Figure 2A:
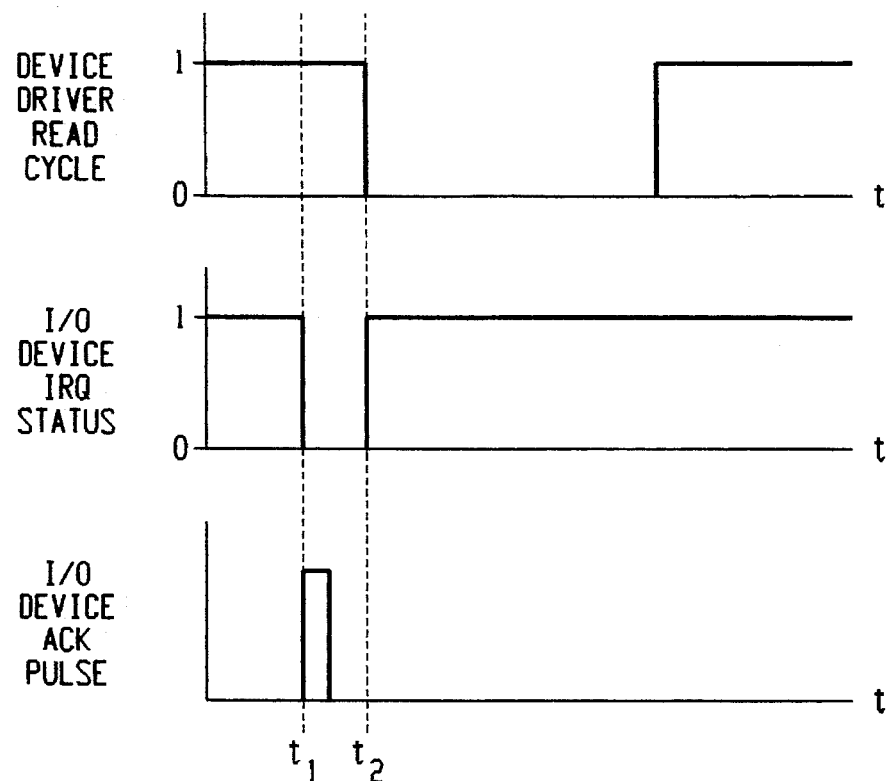
FIGS. 2A and 2B are timing diagrams of signals generated by the device driver and the input/output device of the system of FIG. 1.

The device status register 26 in each I/O port 14 indicates the operational status of the attached I/O device by maintaining the status of the hardware interrupt or error signals which it generates. As shown in FIG. 2A, each of the I/O devices pulses an acknowledge (ACK) signal active (high) at time $t_1$ whenever the I/O device needs to be serviced by the device driver 18, for example, when an I/O device needs to acknowledge accurate transmission of a byte of data sent to it by the device driver. The ACK signal is sent to the device status register over the interrupt request line 32 (see FIG. 1). The rising edge of the ACK pulse latches the interrupt request status bit in the device status register active (low) for that I/O device, indicating that the I/O device has an interrupt request pending.

The programmable interrupt controller 20 senses the ACK pulse generated by the I/O device requesting service by operating in a priority based fashion to continuously monitor the status of the interrupt request line 32 (IRQ7 in the IBM® Micro Channel® architecture) for each I/O device. The programmable interrupt controller identifies for the processor the interrupt level which has requested service via its interrupt request line 32. The processor identifies and executes the device driver requesting notification of an interrupt. If more than one I/O device has requested service, the device driver, via logic therein, determines in round robin fashion the order in which the device driver is to service the I/O devices based on an established priority.

A user requests a data transmission such as a print operation by executing a print request which enters the device driver at its main print routine. At that point, the first byte of data which is to be sent to the I/O device is sent to the device data register 24 and then to the appropriate I/O device. Upon successful receipt of the first byte of data, the I/O device pulses its ACK signal which latches the interrupt request status bit active low (interrupt pending) for that device in the device status register 26. The device driver 18 monitors the interrupt request status bits in the device status registers for all of the I/O ports and corresponding devices which it services, and executes read cycles to determine this status. As shown in FIG. 2A, the device driver reads the interrupt pending status at time $t_2$, and the interrupt request status bit for that I/O device is subsequently cleared. The device driver proceeds to load the next byte of data to be sent to the I/O device in the device data register. This manner of operation as shown in FIG. 2A permits the I/O device to again latch the interrupt request status bit status to zero (interrupt pending) upon acknowledgement of receipt of the next byte of data, to be read and subsequently reset by the device driver. The device driver then resets the interrupt at the programmable interrupt controller.

As explained above and shown in detail in FIG. 2B, however, operational difficulties are encountered in a multi-port environment upon the simultaneous occurrence at time $t_2$ of (i) the arrival of the rising edge of an ACK signal for a particular device which should set the interrupt request status bit for that device to zero, and (ii) the reading and subsequent resetting of the interrupt request status bit to one by the device driver 18. In this situation, at time $t_2$ the interrupt request status bit is never latched low to indicate an interrupt pending, because simultaneously at time $t_2$ the interrupt request status bit is reset high by the device driver, indicating to the device driver that no interrupt is pending for that device. The interrupt is "lost" because it is reset before it can be read, and the device driver 18 fails to see an acknowledgement of the previous byte of data transmitted to the I/O device. The system encounters a deadlock condition, at least with respect to the I/O device corresponding to the improperly reset interrupt request status bit, as the device driver continues to wait for this I/O device to acknowledge receipt of the previous byte of information, while the I/O device waits for the next byte of data to be sent by the device driver. After a normal timeout timer expires (typically on the order of 45 seconds) the device driver terminates transmission of data and returns a "cancel or retry" message to the request originator.

Figure 2B:
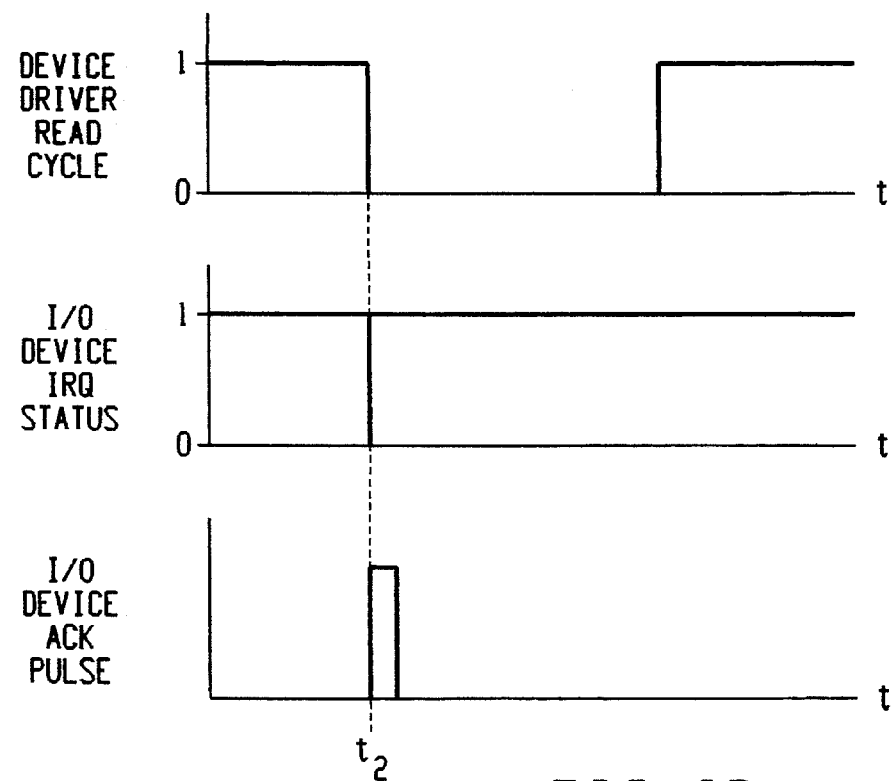
Figure 3A:
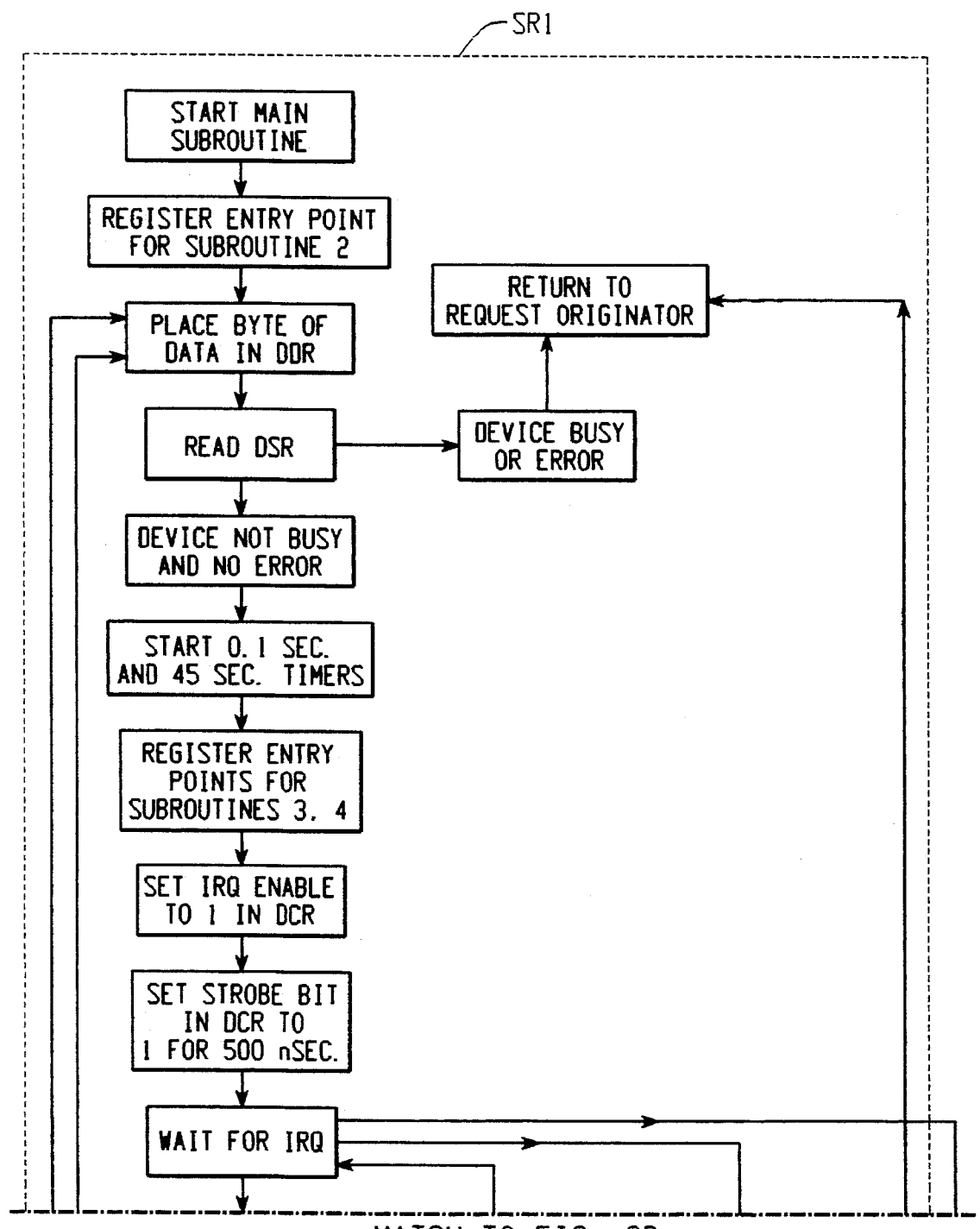
FIG. 3 is a flow chart representing logic which is implemented in the device driver of the system of FIG. 1 to provide the method and system for detecting hardware interrupts of the present invention.
Figure 3B:
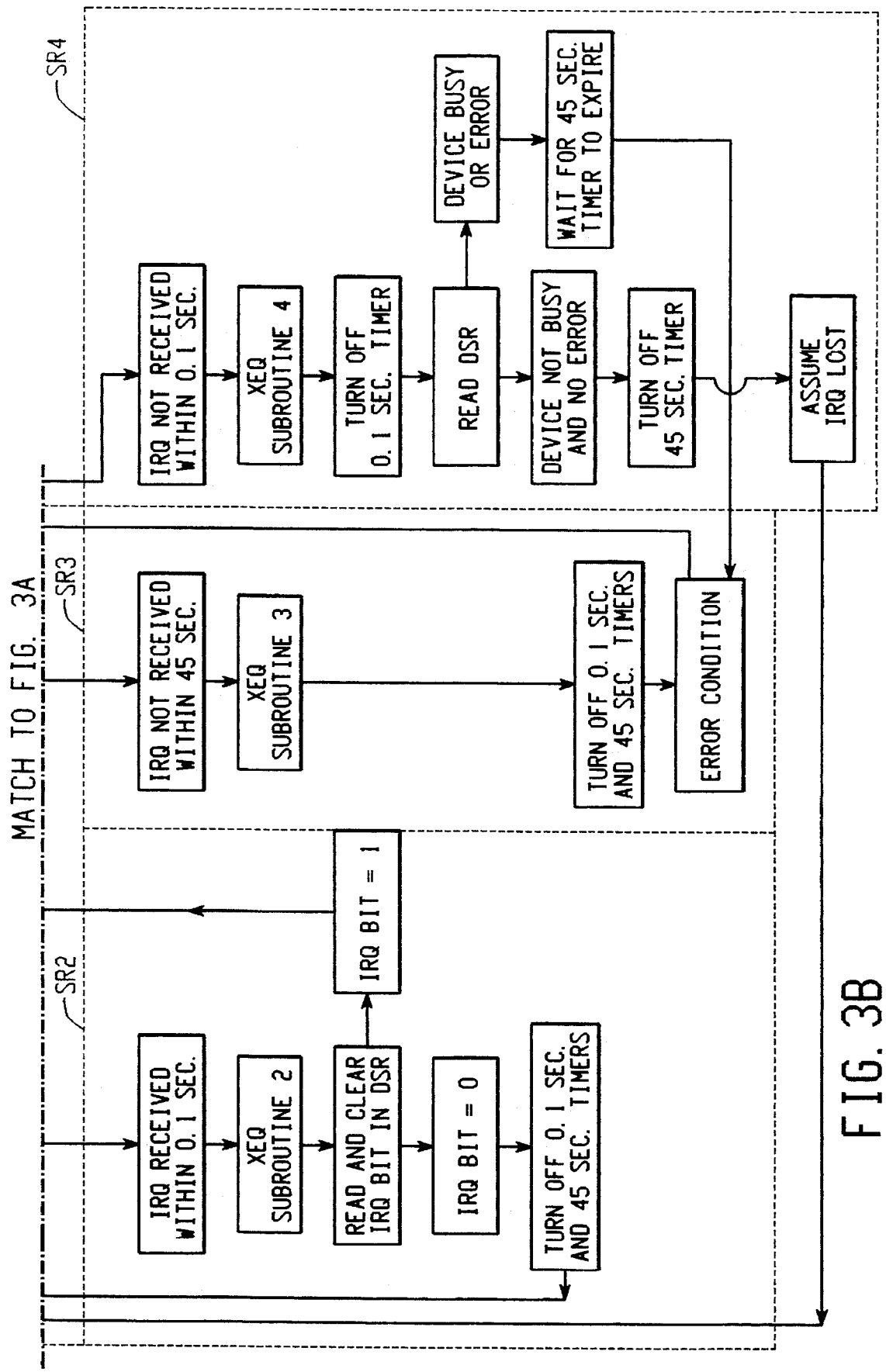

The flow chart depicted by FIG. 3 represents the operation of logic which is implemented in the device driver 18 to prevent the lost interrupt condition occurring under the timing sequence of FIG. 2B. Implementation of the logic according to the flow chart of FIG. 3 accommodates the lost interrupt situation where the device driver reads and resets the interrupt request status bit for an I/O device prior to it being latched by the arrival of the rising edge of an ACK pulse. The logic includes a second timer in addition to and of significantly less duration than the normal timeout timer. Upon expiration of this additional timer, the device driver, upon satisfying a number of conditions, presumes that an interrupt has been lost, and proceeds to send the next byte of data to the I/O device, thereby preventing a deadlock condition. The flow chart of FIG. 3 and the accompanying description specifically describe a multi-tasking print routine for detecting and correcting a lost interrupt in the context of an I/O device which is a printer, although the same principle may be used in connection with other I/O devices attached to the port 14.

The logic represented by the flow chart is implemented via a set of four subroutines (SR1 through SR4) in the device driver which together comprise the print routine. The main subroutine is subroutine 1 (SR1). The start of the flow chart of FIG. 3 presumes that the device driver 18 has been called to execute a print routine to print data, the location in memory of which has been identified, along with the length of the data and the destination I/O device to which it is to be sent. This occurs, for example, when a user initiates a print request. The device driver 18 begins execution of subroutine 1 (SR1) by registering an entry point into subroutine 2 (SR2). Registration of this entry point indicates that the device driver will gain control and execute subroutine 2 (SR2) upon detection of an interrupt request generated by a particular I/O device.

The device status register 26 is read. If the read of the device status register bits indicates that the I/O device is either busy or that an error condition exists (e.g. device error, no paper, or printer not selected), an appropriate error is returned to the print request originator. Otherwise, the first byte of data to be sent to the I/O device 16 which is the target of the print request is loaded into the device data register 24, and the normal timeout timer (of around 45 seconds) and the invention timeout timer (of about 0.1 second) are started. Corresponding entry points for the execution of subroutines 3 and 4, SR3 and SR4 respectively, are registered at this time.

The interrupt request (IRQ) enable bit is set to 1 in the device control register 22 for the I/O device 16 which is the target of the print request. The strobe bit in the device control register 22 is then set to one (active) for 500 nanoseconds, the time interval during which the byte of data is valid and during which it must be read by the I/O device. Upon completion of the 500 nanosecond interval, the strobe bit is reset to zero and the main print routine is in an idle condition, waiting for an ACK signal acknowledging that the I/O device 16 has read the byte of data.

Upon detection of an active interrupt request status bit within 0.1 second (i.e., before either of the two timers expires), the processor calls the device driver at subroutine 2 (SR2). The device driver, having read the interrupt request status bit in the device status register 26, clears this interrupt request status bit (resets to 1). If the interrupt request status bit was read as a one (no interrupt pending), the interrupt which occurred within 0.1 second must have been generated by a device which is sharing the IRQ7 line but which is not controlled by the device driver. In this situation, the device driver returns to the processor which calls another device driver to service the interrupt request. If the interrupt request status bit was read as a zeros it indicates that an I/O device controlled by the device driver sent an ACK signal and that the data byte was received. The two timers are then reset. If more data is to be sent, the timers are turned back on, subroutine 2 (SR2) sends the next byte of data to the I/O device 16 via the device data register 24, and returns to the processor which awaits an ACK signal.

Subroutine 3 (SR3) executes if no active interrupt request status bit is detected after 45 seconds. In this situation, the 0.1 second timer and the 45 second timers are reset, and the appropriate error condition is reported to the main print routine and the transmission is cancelled. The main print routine reports the error to the request originator.

Subroutine 4 (SR4) provides the heart of the invention and is executed by the device driver if no active interrupt request status bit is detected after 0.1 second. The 0.1 second timer is reset, and the device driver reads the contents of the device status register 26. If the read of the device status register bits indicates that the I/O device is not busy and that no error condition exists (e.g. device error, no paper, or printer not selected), the 45 second timer is turned off and it is assumed that the lost interrupt condition has occurred. The previous byte of data is presumed to have been transmitted successfully, and that the device is ready to receive the next byte of data. If more data is to be sent, the timers are turned back on, subroutine 2 (SR2) sends the next byte of data to the I/O device 16 via the device data register 24, and returns to the processor which awaits an ACK signal. This method of operation permits the detection of an assumed lost hardware interrupt condition and correction of the condition by allowing the next byte of data to be sent to the I/O device without reporting an error condition. If, however, upon execution of subroutine 4 (SR4), the read of the device status register bits indicates that the I/O device is either busy or that an error condition exists, the 45 second timer is not turned off. In this situation, it is not assumed that the lost interrupt condition has occurred, but that another error condition is responsible for the lost interrupt. The device driver waits until the 45 second timer expires, and the appropriate error condition is reported to the main print routine and the transmission is cancelled. The main print routine reports the error to the request originator.

The collection of subroutines 1 through 4 (SR1 through SR4) has been written in Assembler Language into the parallel port driver for the IBM® OS/2® operating system, versions 1.3 and 2.0. The subroutines have also been written into ABIOS (advanced basic input/output system) to detect and correct the lost hardware interrupt condition. By setting the granularity of the invention timer to only 0.1 second, the logic implemented in the device driver is provided with many opportunities to detect and correct the lost interrupt prior to cancellation of the data transmission request by the normal timeout mechanism.

Accordingly, the preferred embodiment of a method and system for detecting a lost hardware interrupt has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A method of detecting a lost hardware interrupt in a computer system having a plurality of input/output ports, the lost interrupt generated by an input/output device which is connected to a device driver by a corresponding input/output port, the method comprising the steps of:

generating a hardware interrupt signal with the input/output device;

storing a representation of the hardware interrupt signal in a memory device in the corresponding input/output port;

reading said memory device with said device driver to detect if an interrupt is pending for the input/output device;

setting a first timeout period within a first error timeout mechanism to signal an error condition if no interrupt pending has been detected by the device driver upon expiration of said first timeout period;

waiting a predetermined time period as established by a second timeout mechanism which is less than said first timeout period, and immediately thereafter checking the operational status of the input/output device with the device driver to determine if any input/output device errors exist;

disabling said first error timeout mechanism if (i) it is determined by the device driver that no input/output device errors exist and (ii) no interrupt pending has been detected by the device driver; and assuming that a data transmission which failed to result in an interrupt pending has been successfully transmitted so as to enable a subsequent data transmission.

2. The method of claim 1, wherein said plurality of input/output ports are parallel ports.

3. The method of claim 2, wherein said parallel input/output ports are compatible with the IBM® Micro Channel® architecture.

4. The method of claim 2, wherein said input/output device is a printer.

5. The method of claim 4, wherein data to be print by said printer is temporarily stored in a data register in said corresponding parallel input/output port by said device driver prior to being read by said printer.

6. The method of claim 1, wherein said memory device is a register, and wherein said representation of said hardware interrupt signal is latched bit in said register.

7. The method of claim 6, wherein said latched bit is cleared after said register is read.

8. The method of claim 1 wherein said method is performed by a collection of subroutines compatible with the IBM® OS/2® operating system.

9. The method of claim 1, wherein said predetermined time period is less than 0.5 seconds.

10. The method of claim 9, wherein said predetermined time period is on the order of 0.1 second.

11. The method of claim 10, wherein said first timeout period is on the order of 45 seconds.

12. A computer system for detecting a lost hardware interrupt signal, comprising:

at least one input/output device for generating an interrupt signal;

a device driver for detecting the occurrence of said interrupt signal;

a plurality of input/output ports, each port connecting one of said at least one input/output device to said device driver, said input/output ports each including a memory device for storing a representation of the hardware interrupt signal which may be read by said device driver to detect if an interrupt is pending for the input/output device corresponding to that port;

a first error timeout mechanism for signaling an error condition if no interrupt pending has been detected by the device driver upon expiration of a first timeout period of said first error timeout mechanism;

a second timeout mechanism having a second timeout period of lesser duration than said first timeout period; and logic for (i) disabling said first error timeout mechanism if it is determined by said device driver upon expiration of said second timeout period that no input/output device errors exist and no interrupt pending has been detected for a particular port, and (ii) assuming that a data transmission which failed to result in an interrupt pending has been successfully transmitted, so as to enable a subsequent data transmission.

13. The system of claim 12, wherein said plurality of input/output ports are parallel ports.

14. The system of claim 13, wherein said parallel input/output ports are compatible with the IBM® Micro Channel® architecture.

15. The system of claim 13, wherein said at least one input/output device is a printer.

16. The system of claim 15, wherein data to be printed by said printer is temporarily stored in a data register in a corresponding parallel input/output port by said device driver prior to being read by said printer.

17. The system of claim 12, wherein said memory device is a register, and wherein said representation of said hardware interrupt signal is latched bit in said register.

18. The system of claim 12 wherein said disabling logic is implemented by means of a collection of subroutines compatible with the IBM® OS/2® operating system.

19. The system of claim 12, wherein said second timeout period is less than 0.5 seconds.

20. The system of claim 19, wherein said second timeout period is on the order of 0.1 second.

21. The system of claim 20, wherein said first timeout period is on the order of 45 seconds.

* * * * *